July 1, 1958  W. J. GEORGE  2,841,121
GASOLINE METER BELLOWS
Filed Nov. 20, 1956

William J. George,
INVENTOR.

BY Ralph Bruth
Attorney.

United States Patent Office 2,841,121
Patented July 1, 1958

2,841,121

GASOLINE METER BELLOWS

William J. George, Canonsburg, Pa.

Application November 20, 1956, Serial No. 623,400

5 Claims. (Cl. 121—187)

This invention relates to meter bellows and particularly to a bellow for multipliston meters such as are used in gasoline pumps and the like.

Multipiston meters used in gasoline pumps have a rotary valve mechanism which simultaneously connects opposing pistons, one to an inlet and the other to an outlet so that as one piston is pumping the other piston is discharging a fixed quantity of fluid. One of the very difficult problems in such meters is to seal the rotary valve to the separate inlet and outlet means so that there can be simultaneous discharge and intake through the valve.

It is an object of the present invention to provide a meter ring or bellows which connects with and seals a rotary valve from separate input and output chambers.

It is a further object of this invention to provide a meter ring or bellows having mating telescoping ring members surrounded by a fluid resistant resilient membrane.

It is still another object of this invention to provide a meter ring or bellows having a cylindrical neoprene side wall removably connected to circular sliding sealing members resiliently urged apart.

Other objects, advantages and purposes of this invention will be apparent from a consideration of the following description and the accompanying drawings and claims in which:

Figure 1:
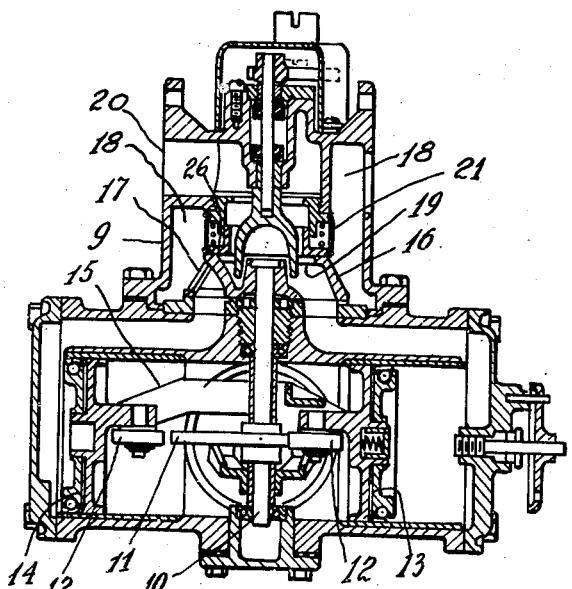
Figure 1 is a section through a multipiston meter including the bellows of this invention.
Figure 4:
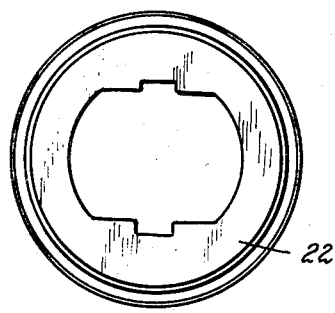
Figure 4 is a top plan view of the bellows of Figure 3.
Figure 5:
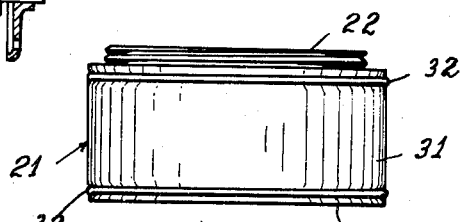
Figure 5 is a side elevation of the bellows of Figure 3.
Figure 3:
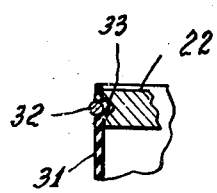
Figure 3 is an enlarged segmental section taken from Figure 3 showing the removable resilient membrane.
Figure 6:
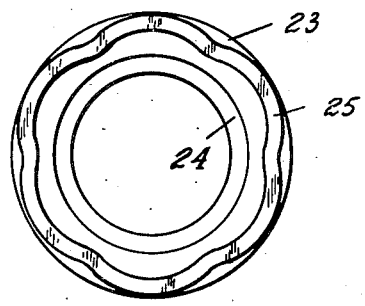
Figure 6 is a bottom plan view of the bellows of Fig. 3.
Figure 2:
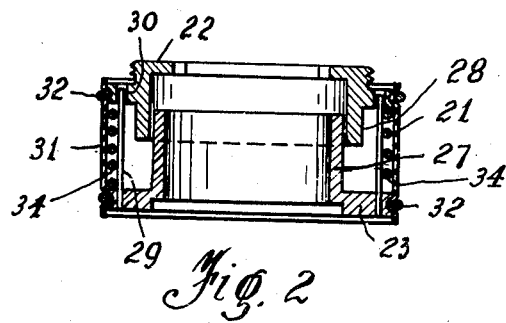
Figure 2 is an axial section of the bellows of Figures 1 and 2.

Referring to the drawings there is illustrated a conventional multipiston meter housing 9 having a vertical drive shaft 10 carrying a drive eccentric 11 which contacts cam follows 12 actuating paired piston 13 and 14 on opposite sides of the drive shaft 10. The pistons 13 and 14 are connected by arms 15 so that they move in unison. Connected to the drive shaft 10 is a rotary valve 16 provided with a side port 17 adapted to communicate from an inlet chamber 18 in the housing 9 to the chamber of piston 14. A central port 19 communicates from the chamber piston 13 to an outlet port 20 in housing 9 through a bellows 21 according to this invention. As the valve 16 is rotated 180 degrees the ports 17 and 19 reverse their position with respect to the inlet chamber 18 and outlet port 20. The bellows 21 is made up of a top annular member 22 which threadingly engages the housing 9 and a spaced annular bottom member 23 provided with brass sealing faces 24 and 25 which slidably contact the top face 26 of the rotary valve 16. The bottom member 23 is provided with an axially extending cylindrical flange 27 which telescopes in sliding engagement with a mating flange 28 on the member 22 to form a cylindrical passage from one member to the other. Spaced guide rods 29 are fixed in one of the members 22 and 23 and pass slidably through opening 30 in the other member to restrain the members 22 and 23 against relative rotary motion with respect to another. A cylindrical neoprene membrane 31 is fixed at opposite ends to the two members 22 and 23 by means of spring rings 32 which force the ends of the neoprene membrane 31 into sealing engagement with a groove 33 in each of the two members 22 and 23. A coil spring 34 surrounding the flanges 27 and 28 urges the two members 22 and 23 axially apart so as to maintain the sealing faces 24 and 25 in tight contact with the top face of valve 16. The bellows arrangement provides a tight leakproof passage between the rotary valve and the output port capable of following irregularities in the travel surface of the top face of the rotary valve 16.

In operation fluid to be metered is taken through inlet chamber 18 and passed through port 17 of rotary valve 16 into the chamber of piston 14 (see Figure 1) as the shaft 11 rotates and piston 14 moves to the right viewing Figure 1. Simultaneously piston 13 moves to the right and ejects fluid through port 19 into the interior of the bellows 21 through flanges 27 and 28 to outlet port 20. As the valve 16 rotates the bottom member 23 of the bellows is in sliding sealing contact which is maintained even though the top surface of valve 16 does not remain parallel to the member 22 fixed in housing 9. This is possible by reason of the telescopic nature of flanges 27 and 28 and the flexibility and resilience of the neoprene membrane 29.

While a preferred embodiment of the invention has been illustrated and described herein it will be understood that the invention may be otherwise embodied within the scope of the following claims.

I claim:

1. In a multipiston gasoline meter or the like having a rotary valve simultaneously communicating between an input port and a piston and between an output port and a piston through at least one axial bore in the valve, the improvement comprising a pair of spaced apart annular members, one fixed to one of the input and output ports and the other in sliding sealing contact with an endface of the rotary valve lying transverse to the axis of rotation of the valve, an axially extending flange on each of said annular members, one flange fitting within the other in telescopic manner to form an axially extending passage, resilient means between the two annular members urging said members axially apart and a resilient non porous cylindrical membrane fixed sealingly to the outer edges of each of said annular members and surrounding the axial flanges to form an axially extending passage from the rotary valve to one of the input and output ports.

2. The improvement claimed in claim 1 wherein spaced axial extending guide rods are fixed to one of the annular members and are slidable in openings in the other member whereby to prevent relative rotation between the members.

3. The improvement as claimed in claim 1 wherein the non porous cylindrical membrane is made of neoprene.

4. The improvement as claimed in claim 1 wherein each of the annular members is provided with a peripheral V-shaped groove receiving one end of the resilient cylindrical membrane and a resilient ring member surrounds the membrane in said groove and forces said membrane in sealing engagement with the groove.

5. The improvement as claimed in claim 1 wherein the resilient means urging the annular members axially apart is a coil spring surrounding the flanges and spaced there-from whereby the flanges have freedom for limited universal movement.

References Cited in the file of this patent

UNITED STATES PATENTS

| | | |
|---|---|---|
| 1,489,857 | Stevens | Apr. 8, 1924 |
| 1,770,665 | Anderson | July 15, 1930 |
| 1,985,399 | Blum | Dec. 25, 1934 |
| 2,091,912 | DeLancey | Aug. 31, 1937 |
| 2,116,265 | Hejduk et al. | May 3, 1938 |
| 2,121,120 | DeLancey | June 21, 1938 |
| 2,588,329 | Sillers | Mar. 4, 1952 |
| 2,768,806 | Koehler | Oct. 30, 1956 |

FOREIGN PATENTS

| | | |
|---|---|---|
| 464,325 | Great Britain | Apr. 15, 1937 |